United States Patent [19]
Watson

[11] Patent Number: 5,564,678
[45] Date of Patent: Oct. 15, 1996

[54] RESTRICTOR APPARATUS FOR RELATIVELY SMALL FLUID FLOW

[76] Inventor: Wade B. Watson, 6009 N. 63RD Ave., Glendale, Ariz. 85301

[21] Appl. No.: 451,680

[22] Filed: May 26, 1995

[51] Int. Cl.⁶ ..................................................... F16K 5/10
[52] U.S. Cl. ........................................ 251/208; 251/205
[58] Field of Search ..................................... 251/208, 205

[56] References Cited

U.S. PATENT DOCUMENTS

| | | | |
|---|---|---|---|
| 2,531,480 | 11/1950 | Sparklin et al. | 251/208 |
| 3,329,167 | 7/1967 | Boettcher et al. | 251/208 X |
| 4,380,250 | 4/1983 | Stoll | 251/208 X |
| 5,308,040 | 5/1994 | Torres | 251/208 |

Primary Examiner—Kevin Lee
Attorney, Agent, or Firm—H. Gordon Shields

[57] ABSTRACT

Flow restrictor apparatus utilizes a pair of relatively movable disks. One disk includes an output bore communicating with a groove cut into one face of the disk. The groove is generally circular in configuration. The other disk includes an input bore which communicates with the groove in the opposite disk when the two disks are assembled together. Varying the location of the input bore relative to the groove varies the flow of fluid through the apparatus. A pair of O-rings seal the groove and the two disk elements. A second embodiment utilizes a metering disk disposed between two fixed disks. The fixed disks include aligned bores for input and output, and the metering disk includes aligned grooves on the surfaces which face the fixed disks and a bore through the metering disk joining the aligned grooves.

6 Claims, 3 Drawing Sheets

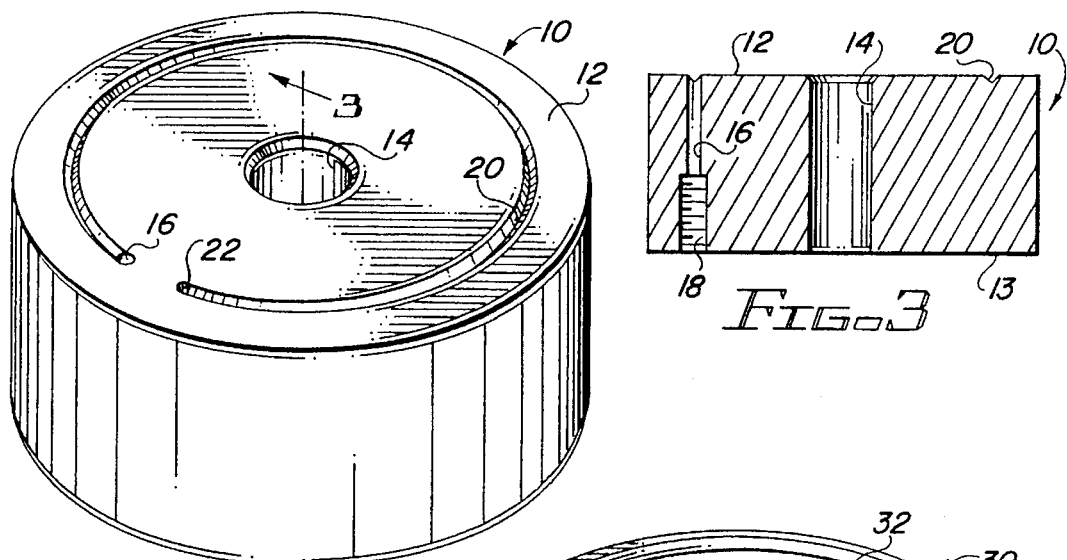
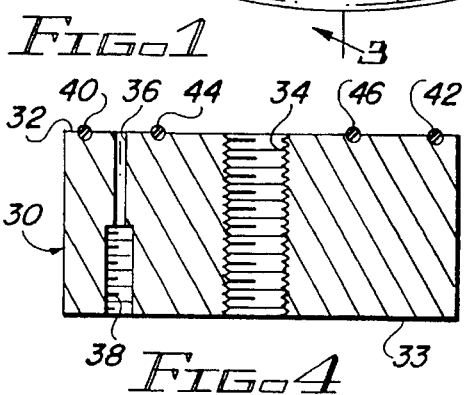
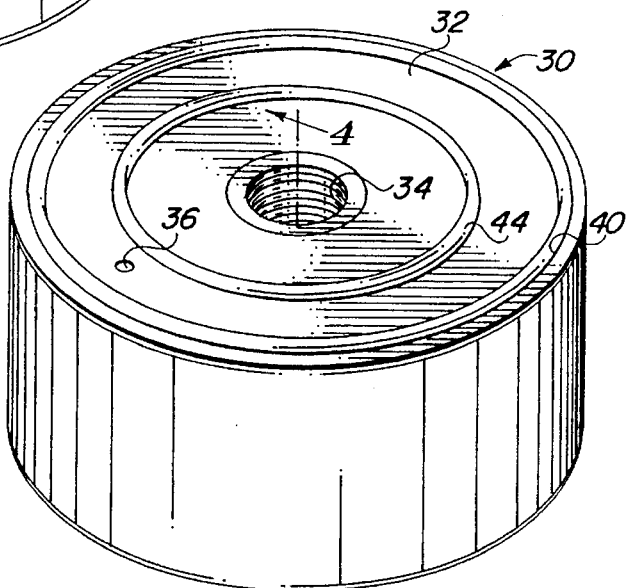
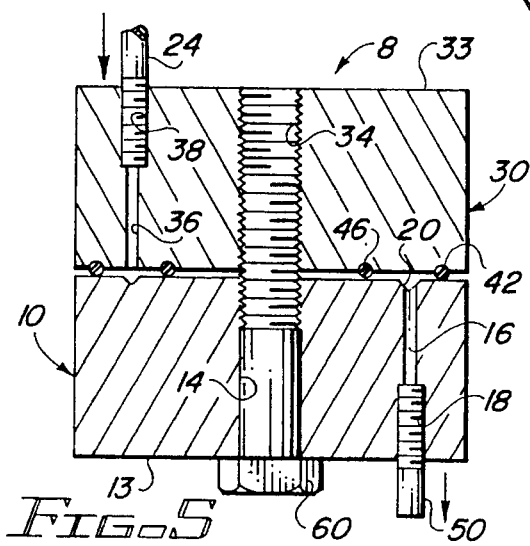
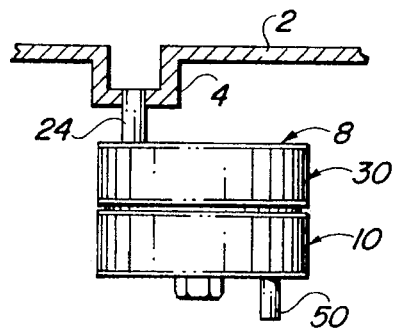
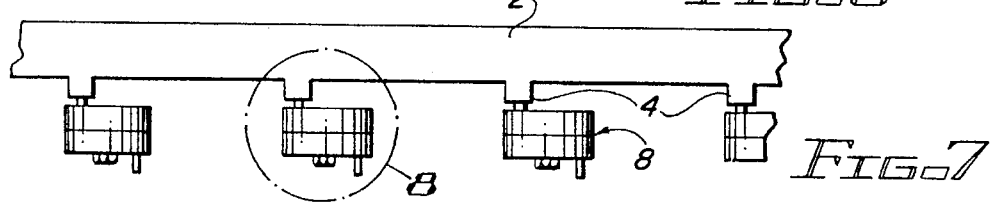

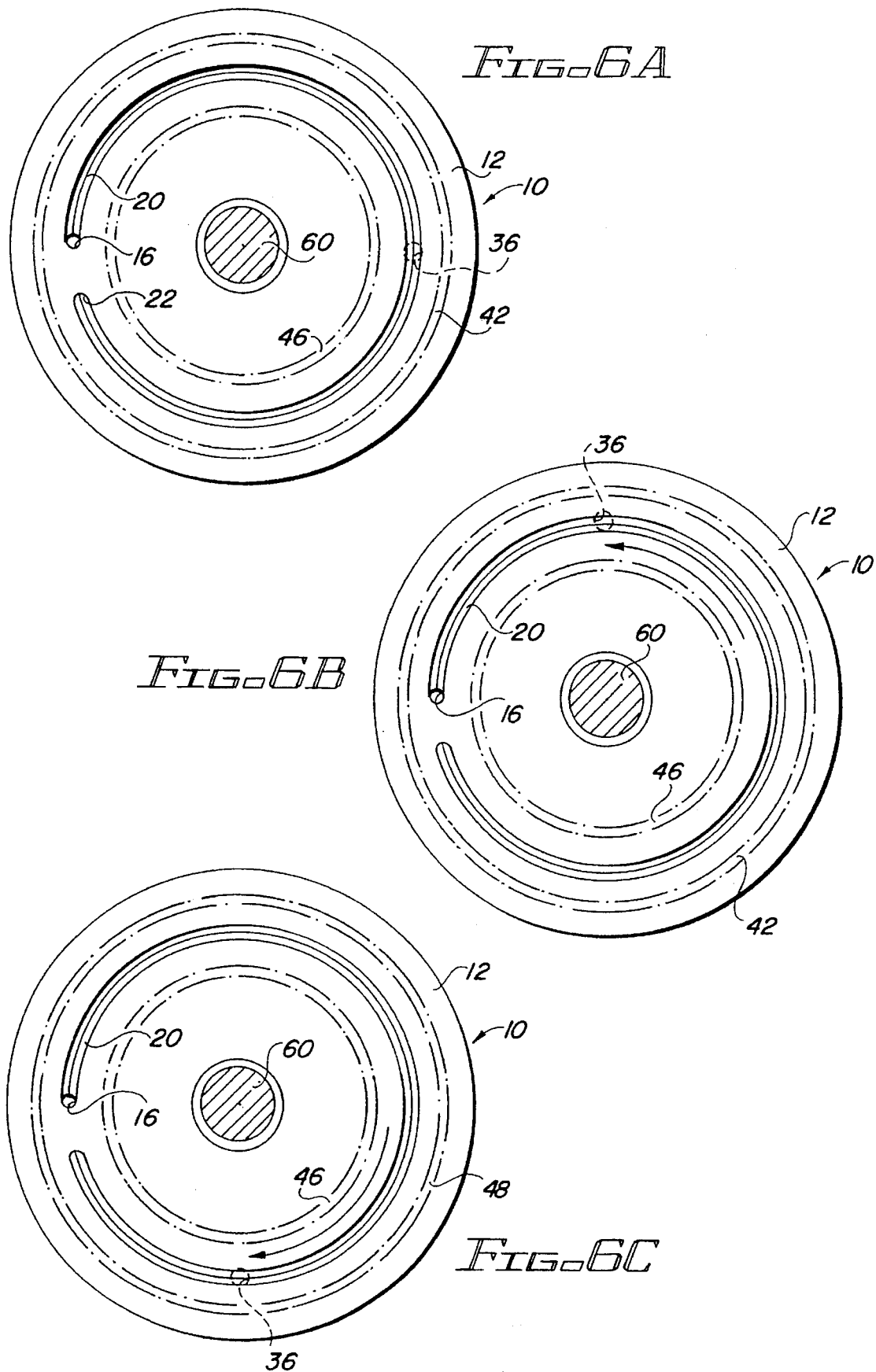

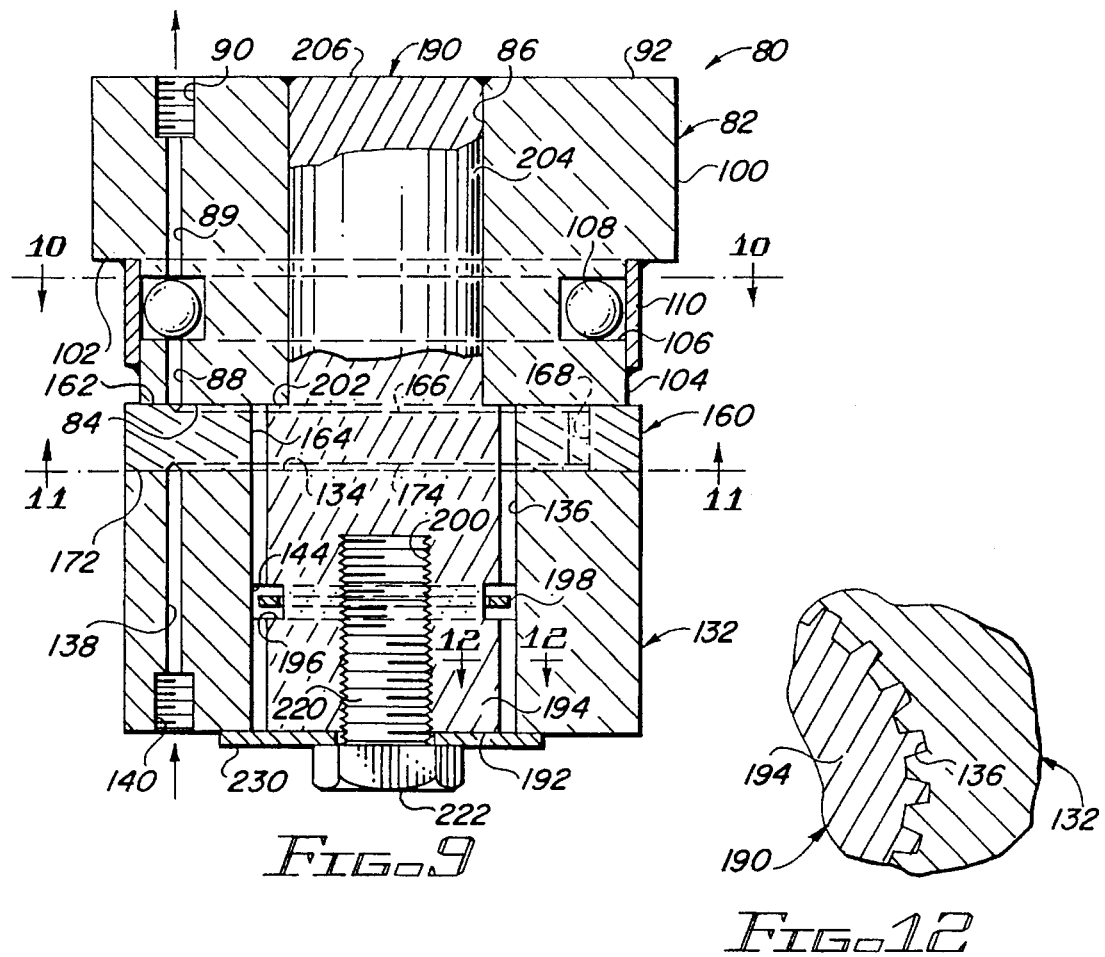
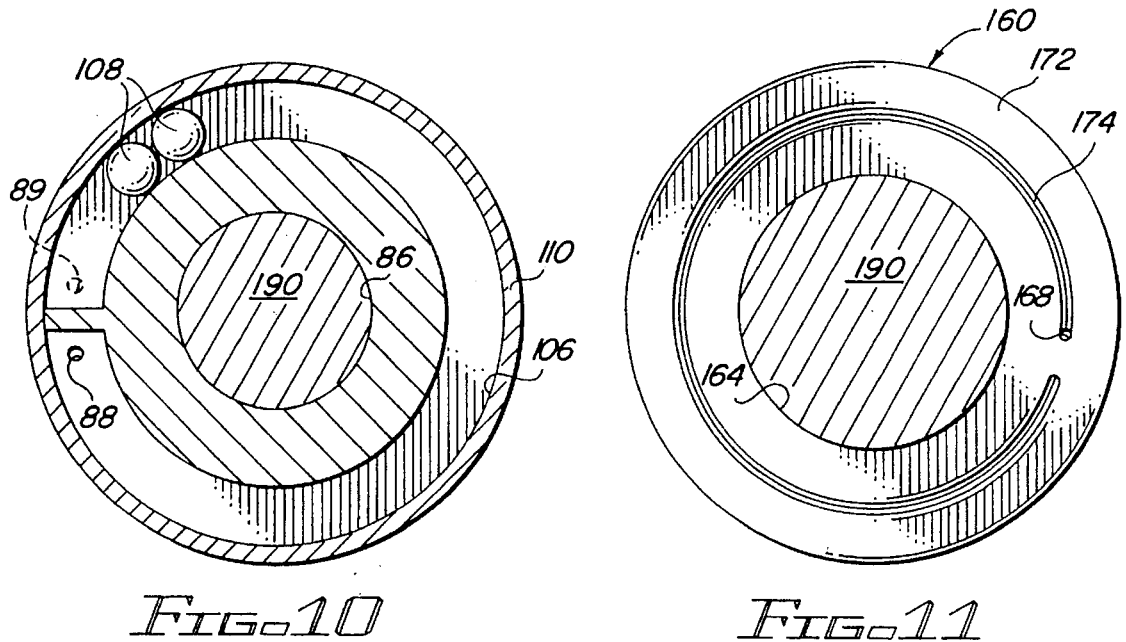

5,564,678

1

RESTRICTOR APPARATUS FOR RELATIVELY SMALL FLUID FLOW

BACKGROUND OF THE INVENTION;

1. Field of the Invention

This invention relates to relatively small fluid flows and, more particularly, to restrictor apparatus for restricting relatively small fluid flows.

2. Description of the Prior Art

U.S. Pat. No. 2,247,227 (Findley) discloses valve apparatus for varying the flow of hot water through a heater core or a vehicle. The valve includes a metering disk having a variably configured opening in the disk. The flow rate varies with the location of the variable sized opening relative to the outlet conduit. As the metering disc is adjusted, more or less of the variable sized opening is exposed to the outlet conduit, thus varying the flow rate of the fluid through the valve apparatus.

U.S. Pat. No. 2,531,480 (Sparklin et al) discloses a variable drip valve which utilizes a metering disk with a variable sizes slot in the disk. The output flow rate of the valve varies with the location of the slot relative to the output conduit of the valve.

U.S. Pat. No. 2,572,950 (Rider) discloses a control valve which also utilizes a rotatable disk with a variable sized slot in the disk. Rotation of the disk varies the location of the slot relative to the input and output conduits of the valve apparatus.

U.S. Pat. No. 2,911,008 (Du Bois) discloses flow control apparatus in which a flow restrictor element includes a relatively movable element and a pair of variable capacity slots. Dam elements, fixed in place, are used to control the fluid flow as the elements are moved relative to each other.

U.S. Pat. No. 2,999,512 (Barkow) discloses valve apparatus in which a metering disk is disposed in the valve body. The metering disk includes a variable sized crescent shaped opening extending through the disk. A valve is movable relative to the metering disk, and movement of the valve controls movement of the flow of fluid through the metering disk. The metering disk is adjustable relative to the valve so that the flow varies through the opening in the metering disk.

U.S. Pat. No. 3,334,861 (Westbrook) discloses a valve in which relative rotation between two members varies the flow of fluid through the members. The members include spiral slots extending through the members and the alignment of the members varies the flow of fluid through the spiral slots.

U.S. Pat. No. 4,477,404 (Stoll et al) discloses a process for producing grooved plates. The purpose of the grooved plates is to vary the flow of fluid in relation to the size of the grooves in the plates.

U.S. Pat. No. 4,946,134 (Orlandi) discloses a pair of ceramic disks usable in a faucet. The disks include variable orifices through them, and the alignment of the disks relative to each other determines the flow of fluid through them.

SUMMARY OF THE INVENTION

The invention described and claimed herein comprises flow restrictor apparatus for restricting a relatively small flow of fluid. The apparatus includes a pair of relatively movable disks, with a V-shaped groove in one disk extending nearly 360 degrees in the disk. One end of the groove communicates with a bore which extends through the disk. The second disk includes a pair of O-ring grooves which are respectively inside and outside the V-shaped groove for sealing the two disks together. An inputs bore on the disk is at the same radius as the V-shaped groove. Relative movement of the two disks aligns the input bore at various locations on the V groove for purposes of varying the fluid flow through the two disk elements, as the disk elements are appropriately secured together. Calibration fluid flows through the apparatus from a manifold, with a plurality of calibrated restrictor elements secured to the manifold. The output from the restrictor elements should be equal, and any variation from equal flow indicates a flow restriction problem in the manifold.

Among the objects of the present invention are the following:

To provide new and useful flow restrictor apparatus;

To provide new and useful flow restrictor apparatus having a pair of disk elements secured together;

To provide new and useful flow restrictor apparatus having a pair of fixed disks and a metering disk disposed between and movable relative to the fixed disks;

To provide new and useful flow restrictor apparatus having a metering disk with a groove on a surface thereof and which metering disk is movable relative to the pair of fixed disks.

To provide new and useful flow restrictor apparatus including a disk having a groove cut into a face of the disk, and having a second disk movable relative to the first disk, with an orifice in the second disk communicating with the groove in the first disk; and To provide new and useful flow restrictor apparatus having a pair of relatively movable disks with input and output bores communicating with a groove in one of the disks.

BRIEF DESCRIPTION OF THE DRAWING

FIG. 1 is a perspective view of a portion of the apparatus of the present invention.

FIG. 2 is a perspective view of another portion of the apparatus of the present invention.

FIG. 3 is a view in partial section taken generally along line 3—3 of FIG. 1.

FIG. 4 is a view in partial section taken generally along line 4—4 of FIG. 2.

FIG. 5 is a view in partial section of the elements of FIGS. 1 and 2 secured together.

FIGS. 6A, 6B, and 6C sequentially illustrate the functioning of the apparatus of the present invention.

FIG. 7 is a schematic representation of the use environment of the apparatus of the present invention.

FIG. 8 is an enlarged view in partial section taken generally from circle 7 of FIG. 5.

FIG. 9 is a view in partial section of an alternate embodiment of the apparatus of the present invention.

FIG. 10 is a view in partial section taken generally along line 10—10 of FIG. 9.

FIG. 11 is a view taken generally along line 11—11 of FIG. 9.

FIG. 12 is a view taken generally along line 12—12 of FIG. 9.

DESCRIPTION OF THE PREFERRED EMBODIMENT

FIGS. 1 and 2 comprise perspective views of two disks 10 and 30, with their mating surfaces facing upwards, and which two disks comprise flow restrictor apparatus of the present invention. FIG. 3 is a view in partial section through the disk 10 taken generally along line 3—3 of FIG. 1. FIG. 4 is a view in partial section through the disk 30 taken generally along line 4—4 of FIG. 2.

FIG. 5 is a view in partial section of the two disks 10 and 30 assembled together to comprise flow restrictor apparatus 8 of the present invention. For the following discussion, reference will, primarily be made to FIGS. 1–5.

Disk 10 comprises an output disk, and disk 30 comprises an input disk. That is, the flow of calibration fluid is from disk 30 into and out of disk 10. Both disks 10 and 30 are approximately the same size, and they differ only in their facing surfaces.

Both disks 10 and 30 are of a general cylindrical configuration with center bores extending axially through the disks. The disk 10 includes a facing surface 12, which comprises, for purposes of FIGS. 1 and 3, a top surface. The disk 10 also includes a bottom or outer surface 13 which is generally parallel to the top or facing surface 12. A bore 14 communicates between the top surface 12 and the bottom or outer surface 13.

Radially outwardly from the bore 14 is a bore 16. The bore 16 extends into the disk 10 from the surface 12. The bore 16 includes a tapped bore portion 18 which extends inwardly from the bottom or outer surface 13. The bore 18 receives a conduit 50, as illustrated in FIG. 5. The conduit 50 comprises an output conduit, as will be discussed below.

A generally uniform and V-shaped groove 20 extends into the surface 12. The groove 20 is on a radius which is the same as that of the bore 16. The groove 20 extends from one end at the bore 16 to an end 22 spaced apart slightly from the bore 16. This is best shown in FIG. 1.

The disk 30, as indicated above, is similar to the disk 10. The disk 30 includes a facing surface 32 and a remote or opposite surface or outer end face 33. The surface 32 may be referred to as the facing surface, and the surface 33 as the bottom or outer surface.

The disk 30 includes a center bore 34 which is tapped, or internally threaded, for purposes of receiving a screw 60 to secure the two disks 10 and 30 together. This will be discussed below in conjunction with FIG. 5.

A bore 36 extends through the disk 30 downwardly or inwardly from the contact or facing surface 32. The bore 36 includes a tapped portion 38 which extends upwardly or inwardly from the outer or bottom surface 33. The bore 38 receives an input conduit 24, as best shown in FIG. 5.

The bore 36 is on the same radius as the groove 20, and accordingly is aligned with the groove 20 when the two disks 10 and 30 are secured together, as again shown in FIG. 5.

The block 30 also includes two O-ring grooves on the surface 32. There is an outer O-ring groove 40 and an inner O-ring groove 44. The outer O-ring groove 40 is on a radius greater than that of the bore 36 and the groove 20, while the inner O-ring groove 44 is on a radius less than that of the bore 36 and the groove 20.

An O-ring 42 and an O-ring 46 are shown in FIG. 4 disposed in the grooves 40 and 44, respectively.

The purpose of the O-rings 42 and 46 is to effectively seal the groove 20 when the two disks 10 and 30 are secured together, as shown in FIG. 5. FIG. 5 comprises a view in partial section through the disks 10 and 30, with the disks 10 and 30 secured together by the screw 60. The surfaces 12 and 32 of the respective disks 10 and 30 are best shown in FIG. 5 as facing towards each other. The input conduit 24 is shown disposed in the tapped bore portion 38, and the output conduit 50 is shown disposed in the tapped bore portion 18. Thus, the restrictor apparatus 8 is shown in its assembled, use, configuration in FIG. 5.

For calibration, the screw 60 is loosened to allow relative rotation between the disks 10 and 30. The relative rotation will be explained below in conjunction with FIGS. 6A, 6B, and 6C.

FIGS. 6A, 6B, and 6C comprise plan views of the disk 10, and its surface 12, with the O-rings 42 and 46 shown in phantom, and with the bore 36 also shown in phantom. The disk 10 is moved relative to the disk 30 to cause the bore 36 to be moved relative to the groove 20. Or, phrased in the opposite manner, the groove 20 and the disk 10 are moved relative to the disk 30 and the bore 36. The movement of the disk 10 relative to the disk 30 varies the location of the input bore 36 relative to the output bore 16. The location of the two bores 16 and 36 varies the fluid flow for calibration purposes.

In FIG. 6A, the relative location of the bores 16 and 36 is generally opposite each other, or with the bore 36 at about a mid point of the groove 22.

The fluid flow through the apparatus 8 is calibrated by moving the disks 10 and 30 relative to each other. Typically, fluid flows of calibration fluid, which is a kerosene product, of about sixty five pounds per hour at about seven hundred fifty PSI are nominally sought. The variation from the desired flow is about one-half pound or so.

To increase fluid flow from the flow provided by the alignment shown in FIG. 6A, the disk 10 is moved to locate the input bore 36 closer to the output bore 16, as shown in FIG. 6B.

To decrease the fluid flow from that shown in FIG. 6A, the bore 36 is located at a greater distance away from the input bore 16, as shown in. FIG. 6C. By varying the relative location of the bores 16 and 36, a desired or predetermined output quantity from the restrictor apparatus 8 may be had.

With a plurality of flow restrictor apparatus 8 calibrated to the same output quantity, the apparatus 8 may be secured to a manifold, such as shown in FIG. 7. FIG. 7 comprises a schematic illustration of a fuel manifold 2 to which a plurality of restrictor apparatus 8 is secured. The manifold 2 includes a plurality of connectors 4, and a flow restrictor apparatus 8 is secured to each connector 4.

FIG. 8 comprises an enlarged view in partial section of a flow restrictor 8 secured to a connector 4 of the manifold 2. The flow restrictor apparatus 8 is secured to the connector 4 through the input conduit 24.

With the flow restrictors 8 secured to the manifold 2, the manifold 2 is appropriately pressurized with calibration fluid, and the fluid flow from each restrictor 8 is measured. Since each of the restrictors 8 are calibrated to provide the same quantitative fluid flow, any variation of the quantity of fluid from any restrictor indicates a problem in the fuel manifold 2.

An alternate embodiment of the restricted apparatus 8 is illustrated in FIGS. 9, 10, and 11. FIG. 9 comprises a view in partial section through flow restrictor apparatus 80. FIG. 10 comprises a view in partial section taken generally along line 10—10 of FIG. 9, while FIG. 11 comprises a view in partial section taken generally along line 11—11 of FIG. 9. FIG. 12 comprises a view in partial section taken generally along line 12—12 of FIG. 9. For the following discussion of the restrictor apparatus 80, reference will be made to FIGS. 9, 10, 11 and 13, as appropriate.

Flow restrictor apparatus 80 is shown in FIG. 9 in partial section. The apparatus 80 includes three primary elements, including an output disk 82, an input disk 132, and a central or center metering disk 160.

The output disk 82 includes a contact surface 84 which is preferably lapped, as are all the other contact surfaces, including the contact surfaces of the metering disk 160 and the contact surface of the input disk 132. The use of the lapped surfaces provides sealing when the elements are secured together, and thus obviates the need for O-rings or other appropriate sealing elements.

Extending through the disk 82 is a center bore 86. Radially outwardly from the bore 86 is an input bore 88. The input bore 88 extends to a groove 106, which will be discussed below. Offset from the bore 88 and communicating with the groove 106 is an output bore 89. The bore 89 extends through the disk 82 from the groove 106 and terminates in a tapped portion 90 adjacent to an outer end face 92. The end face 92 is generally parallel to the contact surface or face 84.

The disk 82 includes two outer peripheral portions, including a major outer peripheral portion 100 and a minor outer peripheral portion 104. The major outer peripheral portion 100 is on a major diameter, while the minor outer peripheral portion 104 has a diameter less than that of the major outer peripheral portion 100. A shoulder 102 extends between the two peripheral portions.

Extending inwardly on the minor outer peripheral portion 104 is a peripheral groove 106. The groove 106 is preferably a generally U-shaped groove extending for nearly 360 degrees, as best shown in FIG. 10. The groove 106 is not a complete circumferential groove, but rather is slightly less than three hundred sixty degrees. The bore 88 extends to the groove 106 at one end, and the bore 89 extends from the groove 106 at its opposite end. The groove 106 is substantially perpendicular to the bores 88 and 89.

The relationship of the bores 88 and 89 is best shown in FIG. 10. The bore 89 is shown in FIG. 10 in phantom for the purpose of illustrating the actual offset relationship of the bores as opposed to the showing of FIG. 9 in which the bores are shown aligned.

Disposed in the groove 106 are balls 108. The balls 108 help to prevent gassing or vaporizing of fuel, as will be discussed in more detail below.

After the balls 108 are placed in the groove 106, a sealing band 110 is used to seal the groove 106 with the balls 108 therein. The band 110 is appropriately secured to the disk 82. In FIG. 9, the band 110 is shown welded to the disk 82.

The disk 132 includes a contact surface 134 which, as indicated above, is preferably a lapped surface.

The disk 132 includes a center bore 136 which is splined to receive a splined portion of a pin 190. The interlacing or interlocking of the splines prevents relative rotation, as will be discussed below.

An input bore 138 extends through the disk 132. The bore 138 is aligned with the bore 88 when the apparatus 80, or its three portions, are secured together.

The bore 138 includes a tapped portion 140 extending inwardly from an outer end face 142.

The metering disk 160 is disposed between the disks 82 and 132. The metering disk 160 includes two surfaces, a surface 162 and a surface 172. The surface 162 faces or is disposed against the surface 92 of the disk 82, while the surface 172 is disposed against the surface 134 of the disk 132. Again, as indicated above, the surfaces 162 and 172 are lapped for sealing purposes.

A center bore 164 extends through the disk 160 and is aligned with the bores 86 and 136.

The surfaces 162 and 172 are appropriately grooved. The surface 162 includes a uniform V-shaped groove 166, and the surface 172 includes a uniform V-shaped groove 174. The grooves 166 and 174 are aligned with each other and are substantially identical and extend for nearly 360 degrees, as shown in FIG. 11. A bore 168 communicates between the two grooves. The bore 168 is at one end of each groove. The opposite ends of the grooves are aligned. That is, both grooves are uniform in size, length, etc. The radius of the grooves 166 and 174 is the same as that of the bores 88 and 138 so that rotation of the metering disk 180 relative to the disks 82 and 132 will vary the fluid flow through the apparatus 80 by varying the location of the bores 138 and 188 relative to the grooves 166 and 174.

A pin 190 extends through the three disks 82, 160, and 132. The pin 190 includes an end face 192 which is aligned appropriately with the end face 142 of the disk 132.

The pin 190 includes two general portions, a major diameter splined portion 194 which matingly extends into the splined central bore 136 of the disk 132, and a minor diameter portion 204 which extends into the center bore 86 of the disk 82. The interlocking of the splined portions 194 and 136 effectively secures the pin 190 to the disk 132 and prevents relative rotation thereof. The splined relationship is best shown in FIG. 12.

A shoulder 202 extends radially between the major diameter splined portion 194 and the minor diameter portion 204. The minor diameter portion 204 extends into the bore 86 of the disk 82.

The pin 190 includes an end face 206 on the minor diameter portion 204 remote from the end face 192. The end face 206 is generally aligned with the end face 92 of the disk 82. The pin 190 is appropriately secured to the disk 82 as by welding at the juncture of the end faces 92 and 206.

The shoulder 202 is disposed against the portion of the surface 84 adjacent to the bore 86 of the disk 82.

A circumferentially extending groove 144 extends into the splines of the bore 136 of the disk 132. An aligned outer peripheral groove 196 extends inwardly from the spline portion 194 of the pin 190. A lock ring 198 is disposed within the aligned grooves 144 and 196. The lock ring 198 effectively locks the pin 190 to the disk 132.

A tapped bore 200 extends into the pin 190 from the end face 192. A screw 220 extends into the tapped bore 200. A washer 230 is disposed against the aligned end faces 192 of the pin 190 and 142 of the disk 132 beneath a head 222 of the screw 220.

By tightening down on the screw 220, the washer 230 effectively secures the metering disk 160 between the disks 82 and 132 by pressing the disk 132 against the disk 160, and thus the disks 82 and 132 against the disk 160 between the disks 82 and 132. By loosening the screw 220, the metering disk 160 may be rotated relative to the disks 82 and 132.

Since the pin 190 is secured to the disk 82, the engagement of the splines on the bore 132 of the disk 130 and of the splined portion 194 of the pin 190, the disks 82 and 132 are effectively permanently aligned. Thus, rotation of the metering disk 160 relative to both the disks 82 and 132 varies the location of the bore 168 relative to the bores 138 and 88. Again, by moving the bore 168 and thus the grooves 174 and 166 relative to the aligned bores 88 and 138, the volume of fluid flow through the apparatus 80 may be varied or adjusted. As the bore 168 is moved closer to the aligned bores 88 and 138, the flow through the apparatus 80 increases. By moving the bore 168 farther away from the aligned bores 88 and 138, the flow of fluid decreases.

As indicated above, the use of the balls 108 in the groove 106 helps to prevent the fuel, which is under a pressure of about seven hundred fifty PSI, from gassing or vaporizing. This, in turn, provides a relatively accurate flow of the fuel through the apparatus 80.

The fuel flow for testing the manifolds, such as the manifold 2 of FIGS. 7 and 8, is quite small, such as about sixty five pounds per hour, as indicated above. Under such conditions, gassing of the fuel may occur, and the use of ball elements in the groove 106 helps to prevent the gassing.

Returning again to FIG. 7, it will be understood that the apparatus 80 may be secured to the connectors 4 of the manifold 2 in place of the restrictor apparatus 8. Moreover, it will be understood that lapping the facing surfaces 12 and 32 of the apparatus 8 will obviate the need for the O-ring grooves and their O-rings.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Restrictor apparatus for relatively small fluid flows comprising in combination:

a first disk;

a first facing surface on the first disk;

a radiused groove on the first facing surface having a first end and a second end and the groove is uniform between the first and second ends;

a first bore through the first disk communicating with the first end of the radiused groove;

a second disk;

a facing surface on the second disk disposed towards the first facing surface of the first disk;

a first bore in the second disk on a radius aligned with the radiused groove on the first facing surface of the first disk; and means for securing the first and second disks together with the first bore in the second disk aligned with the radiused groove on the first facing surface of the first disk to provide a desired output of fluid between the first bore of the first disk and the first bore of the second disk.

2. The apparatus of claim 1 in which the radiused groove on the first disk comprises a V-shaped groove.

3. The apparatus of claim 1 in which the first disk further includes a second bore centrally located with respect to the radiused groove, and the second disk further includes a second bore centrally located with respect to the radius of the first bore on the second disk, and the means for securing the first and second disks together comprises a fastening element extending through the second bores.

4. The apparatus of claim 3 in which the second bore of the second disk is tapped, and the fastening element comprises a screw threadedly engaging the tapped portion of the second disk.

5. The apparatus of claim 1 in which the first disk further includes a second facing surface and a second radiused groove on the second facing surface aligned with the radiused groove on the first facing surface, and which further includes a third disk having a first bore aligned with the first bore of the second disk, and having a facing surface disposed against the second facing surface of the first disk, and fluid flows from the first bore of the second disk to the radiused groove on the first facing surface of the first disk through the first bore of the first disk to the radiused groove on the second facing surface, and to the first bore of the third disk.

6. The apparatus of claim 5 in which the second and third disks are secured together and the first disk is movable relative to the second and third disks to vary the location of the first bores of the second and third disks relative to the radiused grooves and the first bore of the first disks to vary the fluid flow through the first, second, and third disks.

* * * * *